US006826446B1

(12) United States Patent
Volta

(10) Patent No.: US 6,826,446 B1
(45) Date of Patent: Nov. 30, 2004

(54) POSTAL SORTING PROCESS INCLUDING RECOVERY OF ERRORS IN READING CODES AFFIXED TO THE MAIL ITEMS

(75) Inventor: Bruno Volta, Gif sur Yvette (FR)

(73) Assignee: Solystic, Gentilly Cedex (FR)

( * ) Notice: Subject to any disclaimer, the term of this patent is extended or adjusted under 35 U.S.C. 154(b) by 205 days.

(21) Appl. No.: 10/031,432

(22) PCT Filed: Oct. 31, 2000

(86) PCT No.: PCT/EP00/10712

§ 371 (c)(1),
(2), (4) Date: Jun. 11, 2002

(87) PCT Pub. No.: WO01/32322

PCT Pub. Date: May 10, 2001

(30) Foreign Application Priority Data

Nov. 3, 1999 (FR) ........................................... 99/13721

(51) Int. Cl.$^{7}$ ................................................ G06F 7/00

(52) U.S. Cl. ........................ 700/224; 700/223; 209/3.9; 209/584; 209/900

(58) Field of Search ................................ 700/213, 223, 700/224; 209/3.9, 584, 900

(56) References Cited

U.S. PATENT DOCUMENTS 5,031,223 A * 7/1991 Rosenbaum et al. ........ 382/101

* cited by examiner

*Primary Examiner*—Khoi H. Tran
(74) *Attorney, Agent, or Firm*—Pitney Hardin LLP

(57) ABSTRACT

In this postal sorting process, ordered lists (C11–C23) of the sort codes affixed to the mail items are compiled in the handling sorting offices (CTA1, CTA2), these lists being representative of the order of the rail items in the batches of mail items compiled during the handling sorting phase. These lists of codes are transferred from the handling sorting offices to the distribution sorting offices and during the processing of the batches of mail items in a distribution sorting office, the code read by machine on the mail items are compared with the codes extracted from said lists f codes with a view to recovering errors in reading said codes by machine.

3 Claims, 2 Drawing Sheets

POSTAL SORTING PROCESS INCLUDING RECOVERY OF ERRORS IN READING CODES AFFIXED TO THE MAIL ITEMS

BACKGROUND OF THE INVENTION

The invention pertains to a postal sorting process according to which mail items are sorted by machine in first sorting offices so as to compile ordered batches of mail items each corresponding to a certain zone of distribution of the mail items of the relevant batch, and in which said batches of mail items originating from various first sorting offices and corresponding to one and the same distribution zone are processed by machine in a second sorting office so as to compile one or more mailman's rounds, a machine-readable sort code indicative of a distribution address being affixed to each mail item during sorting in one of said first sorting offices with a view to being used during the processing of this mail item in the second sorting office.

The invention applies most particularly to postal sorting in handling sorting offices and subsequently in distribution sorting offices. The machine-readable sort code which is affixed to each mail item during the handling sorting phase is a matrix code, for example a bar code. In the distribution sorting phase where the mailman's rounds are prepared, errors in reading the distribution codes affixed to the mail items may be fairly frequent. These errors may be due to poor printing of the code on the mail item or to poor presentation of the mail item in front of the code reader. These reading errors penalize the performance of the distribution sorting machines and the object of the invention is to remedy this drawback.

SUMMARY OF THE INVENTION

To this end, the subject of the invention is a postal sorting process according to which mail items are sorted by machine in first sorting offices so as to compile ordered batches of mail items each corresponding to a certain zone of distribution of the mail items of the relevant batch, and in which said batches of mail items originating from various first sorting offices and corresponding to one and the same distribution zone are processed by machine in a second sorting office so as to compile one or more mailmans rounds, a machine-readable sort code indicative of a distribution address being affixed to each mail item during sorting in one of said first sorting offices with a view to being used during the processing of this mail item in the second sorting office, characterized in that it furthermore consists in compiling in said first sorting offices, ordered lists of said codes which are representative of the order of the mail items in said batches of mail items; in transferring said lists of codes from the first sorting offices to the second sorting office; and during the processing of the batches of mail items in the second sorting office, in comparing the codes read by machine on the mail items with the codes extracted from said lists of codes with a view to recovering errors in reading said codes by machine.

The invention helps to improve considerably the effectiveness of the handling sorting and distribution sorting phases. The process according to the invention can easily be implemented if the lists of codes are transferred from the first sorting offices (the handling sorting offices) to the second sorting office (a distribution sorting office) by way of a computerized telecommunication network. This implementation may be effected on an existing pool of sorting machines without it being necessary to modify the organization of the successive sorting operations in the handling sorting offices and in the distribution sorting offices.

BRIEF DESCRIPTION OF THE DRAWINGS

An exemplary implementation of the postal sorting process according to the invention is described hereinafter and illustrated in the drawings.

DETAILED DESCRIPTION OF THE PREFERRED EMBODIMENTS

A postal procedure for sorting mail therefore breaks down into several successive sorting phases performed initially in first regional sorting offices, so-called handling sorting offices, then subsequently in second regional sorting offices, so-called distribution sorting offices. Each sorting office has sorting machines which enable it to process the mail posted in the region assigned to it.

Figure 1:
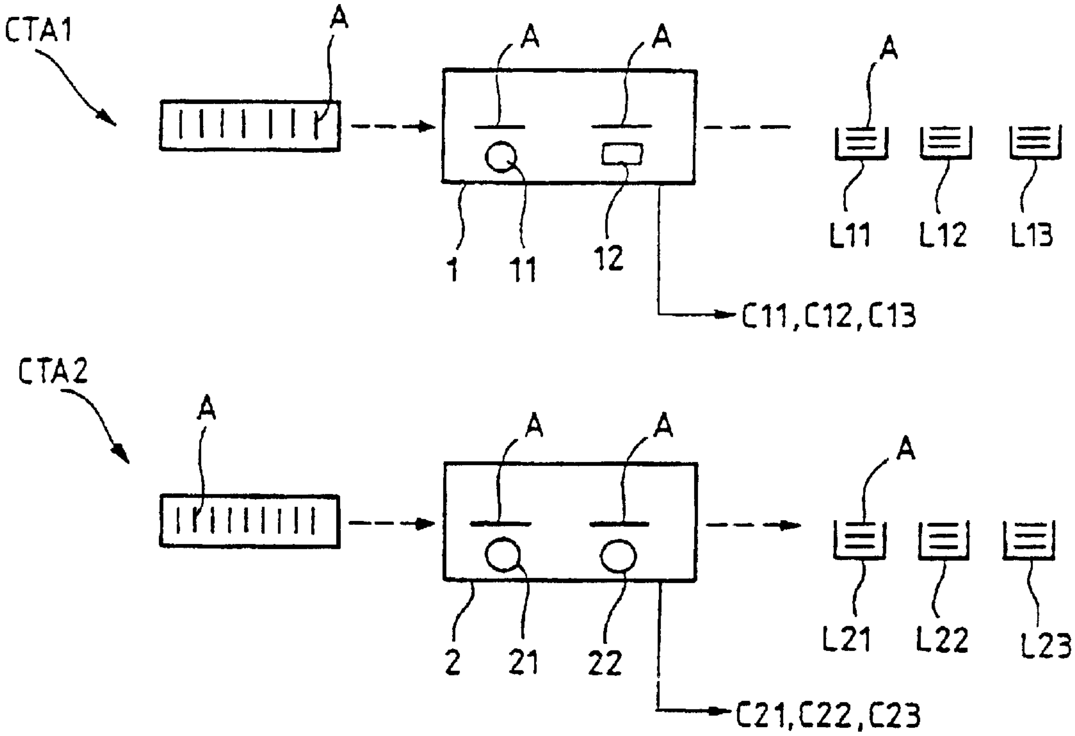
FIG. 1 very diagrammatically illustrates a first handling sorting phase in two handling sorting offices.

In a handling sorting office, sorting consists in separating the mail items received into various batches of mail items, the mail items making up a batch of mail items being intended to be distributed in a certain geographical zone. The definition of handling sorting, that is to say the grouping into batches as a function of distribution zones, is the same in all the handling sorting offices. In FIG. 1, this handling sorting phase has been illustrated in two handling sorting offices CTA1 and CTA2. In each handling sorting office, mail Items A in a stack are loaded into a sorting machine illustrated by a block, respectively 1 and 2. The machine 1 of the office CTA1 compiles various batches of mail items indicated by L11, L12 and L13 each corresponding to a certain distribution zone of the mail items of the relevant batch. The machine 2 of the office CTA2 also compiles various batches of mail items indicated by L21, L22 and L23 also each corresponding to a certain postal distribution zone. It is of course understood that FIG. 1 only illustrates a small number of batches which in reality are much more numerous on exiting each sorting machine. Each batch of mail items is packed into a box so as to be easily transported to a distribution sorting office.

As illustrated in FIG. 1, each sorting machine 1, 2 respectively, comprises a device 11, respectively 21, for reading and analyzing the postal distribution address of each mail item A processed by the machine and a device 12, respectively 22, for printing a sort code on each mail item which is machine-readable and which is indicative of the postal distribution address of this mail item which has been read by the device 11, respectively 21. This code makes it possible to speed up the subsequent sorting operations carried out on the coded mail items. This code is conventionally a bar code which directly identifies the destination of the mail item or else constitutes a unique identifier of the mail item which serves to retrieve the destination of the mail item from a database.

It is of course understood that the devices 11 and 12 of the sorting machine 1 and the devices 21 and 22 of the sorting machine 2 are organized around a microcomputer (or a similar electronic control unit) which governs the sorting procedure in the sorting machine to which it is assigned.

Each microcomputer governing the sorting procedure in a sorting machine such as 1 or 2 is able to compile for each batch of mail items compiled by the sorting machine, an ordered list of sort codes which is representative of the order of the mail items in the relevant batch of mail items. In FIG. 1, C11, C12 and C13 respectively designate the lists of codes compiled by the sorting machine 1 in respect of batches L11, L12 and L13 in the sorting office CTA1. Likewise, C21, C22 and C23 respectively designate the lists of codes compiled by the sorting machine 2 in respect of batches L21, L22 and L23 in the sorting office CTA2. These lists of codes are in practice electronic files which can be transferred by way of a computerized telecommunication network from the handling sorting office where they have been compiled to one or more distribution sorting offices, doing so in parallel with the transporting of the boxes of mail items.

To simplify the description of the process according to the invention, the batches L11 and L21 compiled respectively in the handling sorting offices CTA1 and CTA2 will be regarded as corresponding to one and the same distribution zone.

Figure 2:
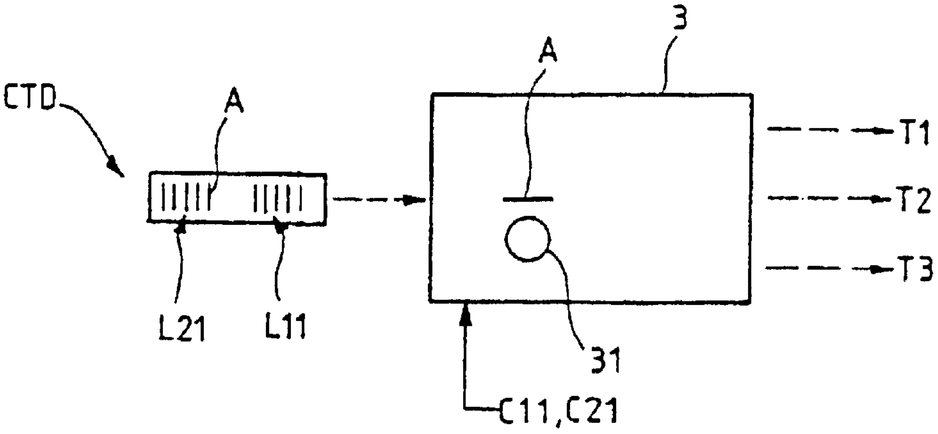
FIG. 2 very diagrammatically illustrates a second distribution sorting phase in a distribution sorting office.

FIG. 2 illustrates a distribution sorting phase which is carried out in a distribution sorting office CTD to which the batches of mail items L11 and L21 have been transferred together with the corresponding lists of codes C11 and C21. In this sorting office CTD, the batches of mail items L11 and L21 are merged and loaded into a sorting machine illustrated by the block 3 which, in one or more passes, compiles one or more mailman's rounds indicated by T1, T2, T3. The sorting machine 3 comprises a reader 31 of the sort codes affixed to the mail items, for example a bar code reader, this making it possible to speed up the sorting procedure. In practice, the mail items A constituting the batches L11 and L21 are stacked and serialized before each traveling past the reader 31 so as to be sorted. Although the operations for destacking and for placing the mail in the boxes are usually manual, one can regard the order of destacking of the mail items A in the sorting machine 3 as generally being identical to the order in which the mail items have been stored in a box originating from a handling sorting office. The sorting procedure of the sorting machine 3 is also governed by a microcomputer or similar which is able to compare the codes obtained by the reader 31 on the mail items A with the codes extracted from the lists of codes C11 and C12 so as to recover reader 31 reading errors.

Figure 3:
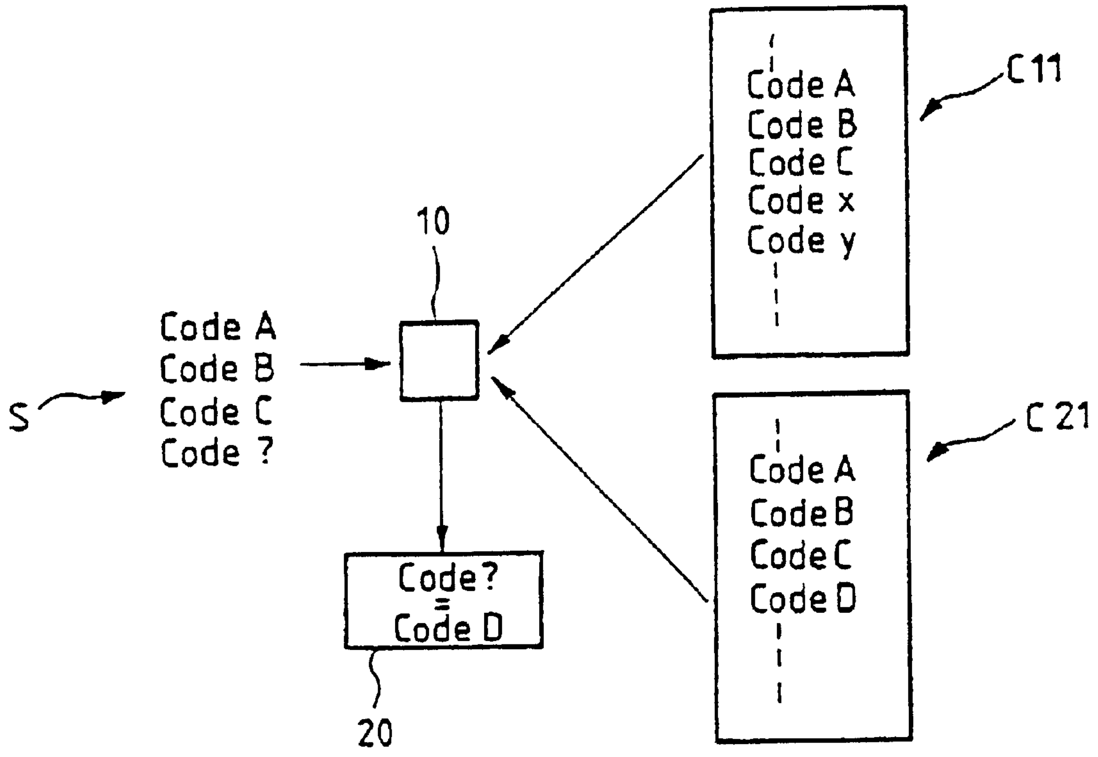
FIG. 3 illustrates the comparing of the codes read by machine on the mail items and the codes extracted from the lists of codes.

More particularly in FIG. 3, this entails comparing a current sequence S of codes read by the reader 31 during the destacking of the mail items with a sequence of the same depth in the lists of codes supplied to the sorting machine 3, here C11 and C12, so as to identify at 10 in one of these lists of codes, the sequence of codes which corresponds to the current sequence of codes which is obtained by the reader 31. Thus, when a code affixed to a mail item cannot be read off by the reader 31 from this mail item, as indicated by the code ?, for example because this code is poorly printed or because the mail item is not properly presented in front of the reader, the code sequence identified in one of the lists of codes, in the exemplary case the list C21, is used to automatically deduce by association for example (code ?=code D) at 20 the value of the code which could not be read by the reader 31. The depth of the code sequences compared must be sufficient to avoid erroneous corrections. A depth of more than three mail items may typically be used. It is however limited by the time available between the instant at which the code of a mail item is read by the reader 31 and the instant at which this mail item is routed to a sorting receptacle.

What is claimed is:

1. A postal sorting process comprising the steps of:

in a first sorting office:

a) printing on mail items machine-readable sorting codes each one indicative of a distribution address of a mail item;

b) sorting the mail items so as to compile ordered batches of mail items each corresponding to a certain zone of distribution of the mail items;

c) compiling for each ordered batch of mail items a corresponding ordered list of sorting codes which is representative of the order of the mail items in said corresponding batch of mail items; and d) transferring each ordered batch of mail items with the corresponding ordered list of sorting codes to a second sorting office; and in said second sorting office:

a) reading by machine the sorting codes on said mail items of an ordered batch of mail items in order to sort said mail items so as to compile one or more mailmen's rounds;

b) comparing said ordered batch mail items sorting codes by machine with codes extracted from the corresponding ordered list of sorting codes in order to recover errors in reading said sorting codes.

2. The process according to claim 1, wherein said ordered list of sorting codes is transferred by way of a telecommunication network from the first sorting office to the second sorting office.

3. The process according to claim 1, wherein each sorting code is a bar code.

* * * * *